United States Patent
Farrow

(10) Patent No.: US 10,503,748 B1
(45) Date of Patent: Dec. 10, 2019

(54) ELT MANAGEMENT SERVICE WITH PUBLISH/SUBSCRIBE ARCHITECTURE

(71) Applicant: Amazon Technologies, Inc., Seattle, WA (US)

(72) Inventor: Peter Farrow, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 413 days.

(21) Appl. No.: 15/350,855

(22) Filed: Nov. 14, 2016

(51) Int. Cl.
*G06F 16/00* (2019.01)
*G06F 16/25* (2019.01)
*G06F 16/245* (2019.01)

(52) U.S. Cl.
CPC .......... *G06F 16/254* (2019.01); *G06F 16/245* (2019.01)

(58) Field of Classification Search
CPC .............................. G06F 16/254; G06F 16/245
See application file for complete search history.

(56) References Cited

U.S. PATENT DOCUMENTS

| | | | | |
|---|---|---|---|---|
| 6,772,396 B1* | 8/2004 | Cronin | .................. | G06F 16/958 715/202 |
| 7,032,173 B1* | 4/2006 | Sorge | .................... | G06F 16/258 715/209 |
| 2007/0239636 A1* | 10/2007 | Tang | ...................... | G06N 7/005 706/20 |
| 2012/0109940 A1* | 5/2012 | Ishii | .................... | G06F 16/9535 707/722 |
| 2014/0067702 A1* | 3/2014 | Rathod | .................. | G06Q 10/10 705/319 |
| 2016/0232143 A1* | 8/2016 | Fickenscher | .......... | G06F 16/955 |

* cited by examiner

*Primary Examiner* — Alexander Khong
(74) *Attorney, Agent, or Firm* — Lee & Hayes, P.C.

(57) ABSTRACT

An extract, load, and transform (ELT) management service provides functionality for managing ELT operations, including publish/subscribe functionality. The ELT management service maintains metadata describing publications, such as database tables or files stored by a storage service operating in a service provider network, and publication certificates, which describe the creation and change history for the publications. The metadata can be searched to identify publications that rely on other publications that have changed since the publications were generated. The identified publications can then be automatically republished by executing logical pipelines that specify activities that can be executed to republish the publications.

20 Claims, 11 Drawing Sheets

ELT MANAGEMENT SERVICE WITH PUBLISH/SUBSCRIBE ARCHITECTURE

BACKGROUND

Certain types of data warehouse services are designed to handle large amounts of data for analytical purposes but only for handling a few queries at a time. In such services, it might be necessary to deploy a multitude of database clusters in order to meet service level agreements ("SLAs") and provide response times demanded by users. In these configurations, each of the database clusters can be configured to serve a specific purpose to maintain consistent performance and delivery of data. In order to configure each of the database clusters for operation, it might also be necessary to deliver a core set of database tables to the database clusters on a periodic (e.g. daily) basis.

Several technical problems can result from the highly distributed data warehouse architecture described above. First, because each database cluster is designated for performing a specific purpose, a significant percentage of the database clusters can sit idle a significant percentage of the time. Moreover, because each database cluster is designated for performing a specific purpose, it can also be difficult to load balance queries among the database clusters. Additionally, it can also be difficult to add or re-size existing database clusters.

Second, when delivering database tables to database clusters such as those described above, a per-cluster pipeline can be utilized to execute various activities to load the database tables from a source system to the database clusters. Despite data quality checks and auditing mechanisms, it is possible that problems with input data is only discovered after all of the data has been loaded to the database clusters. As a result, it might be necessary to re-run a large number of activities to correct the problem. Depending upon the number of corrupted input data files received from the source system, this might result in hundreds or even thousands of jobs to re-run. This can be a time consuming and highly error prone process.

The disclosure made herein is presented with respect to these and other considerations.

DETAILED DESCRIPTION

Figure 1:
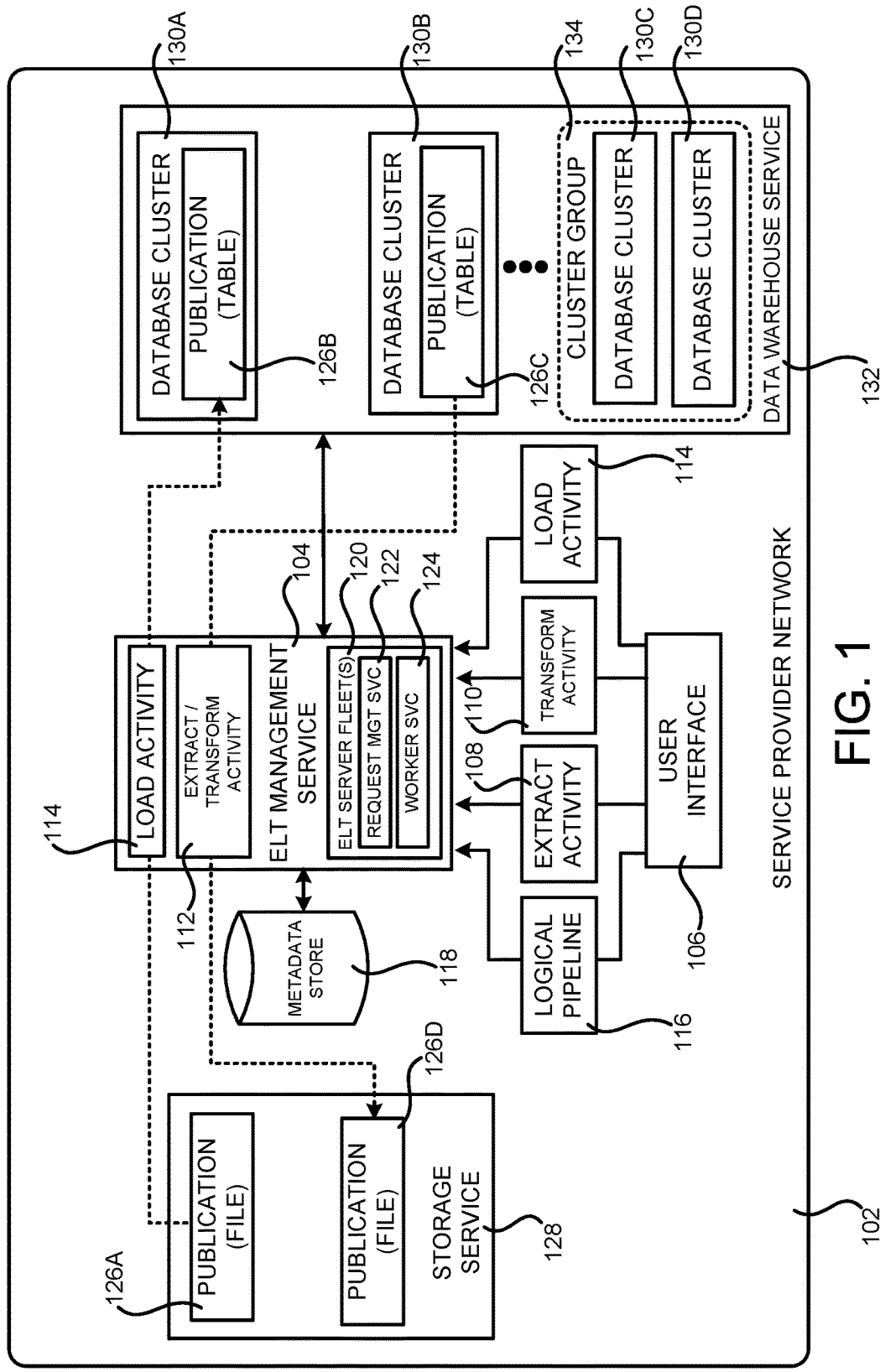
FIG. 1 is a system architecture diagram showing aspects of the configuration and operation of a service provider network that is configured to provide an ELT management service, according to one particular configuration.

The following detailed description is directed to technologies for providing an extract, load, and transform ("ELT") management service. Through an implementation of these technologies, an ELT management service can be provided that enables improved utilization of database clusters provided by a data warehouse service, which can reduce the need for adding new clusters and resizing existing clusters. Moreover, an implementation of the disclosed technologies allows the re-running of hundreds or even thousands of activities to be automated, which can reduce operational load and lower the risk of negatively impacting data accuracy. Technical benefits other than those specifically identified herein can also be realized through an implementation of the disclosed technologies.

According to one particular configuration disclosed herein, an ELT management service is executed in a service provider network. The ELT management service provides functionality for defining and managing ELT operations including, among other things, workflow automation of ELT activities to populate database clusters in a data warehouse service, prioritized throttling of ELT activities, a self-service platform that allows users to create and maintain ELT activities to populate database tables in a data warehouse service, a Web-based UI to create and schedule data transformations, extracts and loads, and a data publisher to push report query results to a variety of network services and in a variety of formats.

The ELT management service disclosed herein also provides publish and subscribe ("publish/subscribe") functionality. In order to provide this functionality, the ELT management service maintains metadata describing publications, such as database tables or files stored by a storage service operating in a service provider network, and publication certificates, which describe the creation and change history for the publications. The metadata can be searched to identify publications derived from other publications that have changed since the publications were generated. The identified publications can then be automatically republished by executing logical pipelines that specify activities that can be executed to republish the publications. Additional details regarding the various components and processes described briefly above will be presented below with regard to FIGS. 1-10.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a service provider network 102 that is configured to provide an ELT management service 104, according to one particular configuration. The service provider network 102 is a distributed network through which customers and/or other users can utilize computing resources, such as virtual machine ("VM") instances, data storage resources, and/or other types of computing resources, on a permanent or as-needed basis.

Each type or configuration of a computing resource can be available from the service provider network 102 in different sizes. For example, a service provider can offer physical hosts, VM instances or other types of data processing resources that are available for purchase and use that have many different configurations of processor capabilities, main memory, disk storage, and operating system. A service provider operating the service provider network 102 can also offer other types of resources for purchase and use by customers.

For example, a service provider can offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The resources can also include, but are not limited to, VM instances and images, security groups, option groups, gateways, option sets, network access control lists ("ACLs"), subnets, storage buckets, network interfaces, snapshots, spot market requests, and storage volumes.

The service provider operating the service provider network 102 can also charge a fee for utilization of the resources to a customer that creates and uses the resources. The fee charged for a particular computing resource can be based upon the type and/or configuration of the computing resource. For example, in the case of a data processing computing resource, like a VM instance, the fee for use of the computing resource can be charged based upon the amount of time the computing resource is utilized. In the case of a data storage computing resource, the fee can be computed based upon the amount of data stored and/or the amount of data transferred into or out of the computing resource. The fees for other types of resources can also be based upon other considerations. A service provider can also utilize various purchasing models to determine the amount to charge a customer for use of resources provided by the service provider network 102.

The resources described above can be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks ("WANs"), such as the Internet. Additional details regarding the configuration of a data center for implementing the functionality disclosed herein will be provided below with regard to FIGS. 7-10.

The resources described briefly above can also be provisioned and de-provisioned as needed in an automated fashion. For example, the service provider network 102 can be configured to instantiate a new instance of a computing resource, such as a VM instance, in response to an increase in demand for a network service or other condition. Other types of computing resources can also be provisioned and de-provisioned in a similar manner. Network services in the service provider network 102 can also provide functionality for automatically scaling and/or de-scaling resources based upon demand for the resources and/or other factors.

A customer or potential customer of the service provider network 102 can utilize an appropriate computing system (not shown in FIG. 1) to communicate with the service provider network 102 over an appropriate data communications network (also not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102 can be utilized to purchase computing resources in the service provider network 102, to configure aspects of the operation of the computing resources through a management console (not shown in FIG. 1) or other type of interface, to access and utilize functionality provided by the various services and systems described herein, and/or to perform other types of functionality with regard to the operation of the computing resources provided by the service provider network 102.

A customer computing system might be any type of computing device capable of connecting to the service provider network 102 via a suitable data communications network such as, but not limited to, a laptop or desktop computer, a smartphone or tablet computing device, a server computer, or a mobile telephone. Administrative users employed by the operator of the service provider network 102, such as administrators managing the operation of the service provider network 102, can also connect with, manage, and utilize resources provided by the service provider network 102 in a similar fashion.

As discussed briefly above, the service provider network 102 can also be configured to provide various types of network services for use internally and by customers. For example, and without limitation, the service provider network 102 can provide an on-demand computing service for providing VM instances on-demand, a data storage service for storing data, a cryptography service, a database service, a notification service, an authentication service, a policy management service, and, potentially, other types of network-accessible services. These and other services and their associated resources can be utilized together to implement various types of network-based applications in the service provider network 102. Additional details regarding one implementation of the service provider network 102 and several types of network services that can be provided by the service provider network 102 will be discussed below with regard to FIGS. 7-10.

As shown in FIG. 1 and discussed briefly above, the service provider network 102 can also be configured with an ELT management service 104. As discussed briefly above, the ELT management service 104 provides functionality for defining and managing ELT operations including, among other things, workflow automation of ELT activities to populate database clusters 130 in a data warehouse service 132, prioritized throttling of ELT activities, a self-service platform that allows users to create and maintain ELT activities to populate database tables 126 in the data warehouse service 132, a Web-based user interface ("UI") 106 to create and schedule data extracts to files stored by a storage service 128 in the service provider network 102, and a data publisher to push report query results to a variety of network services, such as the storage service 128, and in a variety of formats.

As also discussed briefly above, the ELT management service 104 disclosed herein also provides publish/subscribe functionality. In order to provide this functionality, the ELT management service 104 maintains a metadata store 118 that includes metadata that describes "publications" 126. The publications 126 can be database tables that are published and stored on database clusters 130 utilized by a data warehouse service 132 operating in the service provider network. In the example shown in FIG. 1, for instance, the database cluster 130 stores a publication 126B and the database cluster 130B stores a publication 126C. The publications 126 can also be files published to and stored by a storage service 128 operating in the service provider network 102. In the example shown in FIG. 1, for instance, the publications 126A and 126D are stored by the storage service 128.

The metadata stored by the ELT management service 104 in the metadata store 118 also includes publication certificates, which describe the creation and change history for the publications 126. Additional details regarding the metadata stored in the metadata store 118 describing the publications 126 and the corresponding publication certificates will be provided below with regard to FIGS. 2A and 2B.

As will be described in greater detail below, the ELT management service 104 can search the metadata described briefly above identify publications 126 that are derived from other publications 126 that have changed since the publications were generated. The identified publications 126 can then be automatically republished by executing logical pipelines that specify activities that can be executed to republish the publications 126.

Through an implementation of these technologies, and others described herein, the ELT management service 104 can improve utilization of the database clusters 130 provided by the data warehouse service 132, which can reduce the need for adding new database clusters 130 and resizing existing database clusters 130. Moreover, an implementation of the disclosed technologies allows the re-running of hundreds or even thousands of activities to be automated, which can reduce operational load and lower the risk of negatively impacting data accuracy. Technical benefits other than those specifically identified herein can also be realized through an implementation of the disclosed technologies.

As discussed briefly above, the ELT management service 104 provides a UI 106 through which a user of the ELT management service 104 can perform various types of functions. In particular, the UI 106 can provide functionality for allowing a user to define various types of activities that can be executed by the ELT management service 104 on behalf of the user. In order to execute the activities, and to provide the other functionality disclosed herein, a fleet of physical or virtual server computers (referred to herein as the "ELT server fleet" 120) can be utilized by the ELT management service 104. As further illustrated in FIG. 1, the ELT server fleet 120 can execute a request manager service 122 and a worker service 124 in one particular configuration. These services can spawn daemon processes that execute shell scripts in order to run the specific activities. Other types of processes, services, programs, scripts, and other executable components can be utilized to execute the activities disclosed herein in other configurations.

The activities defined through the UI 106 can have a publisher role with regard to publications 126. For example, and without limitation, the UI 106 can permit a user to define an extract activity 108 and a transform activity 110 (which might be jointly referred to herein as an "extract/transform" activity 112) that creates publications. In the example shown in FIG. 1, for instance, an extract/transform activity 112 has created a publication 126A in the storage service 128 by running structured query language ("SQL") statements on the publication 126B stored by the database cluster 130A in the data warehouse service 132.

Similarly, a user can utilize the UI 106 to define a load activity 114. A load activity 114 creates a publication 126 in a target database table in the data warehouse service 132 by running COPY commands to populate the database table. In the example shown in FIG. 1, for instance, the load activity 114 has created the publication 126B on the database cluster 130A by running COPY commands on the publication 126A stored by the storage service 128.

The activities described above can also have a subscriber role with regard to the publications 126. As a subscriber, the activities rely on the publications 126 in different ways. For example, and without limitation, the activities described above can rely upon the publications 126 as pre-conditions for execution, as database tables used to select data from (extract/transform activities 112 only), and as files residing on the storage service 128 that are copied to tables on clusters 130 maintained by the data warehouse service 132 (load activities 114 only).

As will be described in greater detail below, maintaining metadata describing the publications 126 in the metadata store 118 has several important benefits. For example, and without limitation, the metadata stored for the publications 126 enables de-coupling of activities performed by the ELT management service 104. Decoupling a publication 126 from the location at which it is stored, for instance, makes it possible to deploy changes without impacting downstream activities, and can improve the overall reliability of the ELT management service 104. A side benefit for usability is that users of the ELT management service 104 will generally find it more intuitive to search for publications 126 by name and subject area (e.g. in the UI 106), rather than entering tedious and error-prone network paths (as required by previous solutions) when setting up pre-conditions for activities.

As will be discussed in greater detail below with regard to FIGS. 2A and 2B, the ELT management service 104 can store a wide variety of descriptive metadata for the publications 126. For example, and without limitation, the metadata can include the publication name, description, creator name, contact information, statistics, data lineage, and more. A publication 126 can also include a self-describing definition that allows the ELT management service 104 to automatically adopt to schema changes without having to change the code in load activities 114. In order to accomplish this, creators of publications 126 can attach auditor or validation logic that the ELT management service 104 executes automatically when loaded by subscribers (rather than requiring subscribers to write and deploy their own auditors).

Publication 126 authors can also specific access control data that is used to determine the users or groups that have permission to access (e.g. read or write) a publication 126, determine whether a publication 126 is publicly listed in a data catalog or remains private, and specify the groups that have view access to the activity that creates a publication 126. Users can request access to publications 126 through the ELT management service 104, and publication owners can approve or deny the requests.

As discussed briefly above, the metadata stored in the metadata store 118 can also include publication certificates. A publication certificate is a data fact representing that a publication 126 was published for a particular certificate date. It is identified by a publication identifier ("ID") and a certificate date, which corresponds to a schedule date. A schedule date is the date and time an activity is run. In this regard, it is to be appreciated that the ELT management service 104 can support other dimensions for publication certificates in addition to a schedule date. For example, partitions can be defined for things like marketplace, legal entity, product line, region, etc. One benefit of generating publication certificates for more granular partitions is to improve data timeliness. Additional details regarding publication certificates will be provided below with regard to FIG. 2B.

As will be described in greater detail below, the metadata stored in the metadata store 118 can also be utilized to drive automated republishing of publications 126. For example, and without limitation, the ELT management service 104 can perform a query against the metadata to generate a list of all publications 126 that are derived from parent publications that have changed since last being generated. The activities required to republish those publications can then be identified and executed without user intervention. Additional details regarding this process will be provided below with regard to FIGS. 3 and 4.

As shown in FIG. 1, the UI 106 provided by the ELT management service 104 can also provide functionality for defining a logical pipeline 116, which can include one or more logical activities. A logical activity is an activity that is configured to run against a cluster group 134, which may contain one or more clusters 130. In the example shown in FIG. 1, for instance, the cluster group 134 includes two database clusters 130C and 130D. Other cluster groups 134 can include more database clusters 134.

As will be discussed in greater detail below, logical load activities automatically run against every cluster 130 in a cluster group 134. Logical extract/transform activities run against only one cluster 130 in a cluster group 134, where a number of preconditions and, potentially, user-specified rules, are met. The multi-cluster support enabled by the technologies disclosed herein allows activities to run on different clusters, which can improve performance and operational flexibility. Examples include, but are not limited to, running activities on an alternative cluster 130 because the usual cluster 130 it runs on is down, running an activity on the cluster 130 that has the data it needs first, running an activity on a particular cluster 130 for performance reasons, and running an activity on a particular cluster 130 in order to support load balancing. Additional details regarding the operation of the ELT management service 104 for providing virtual pipeline and multi-cluster support, will be provided below with regard to FIGS. 5 and 6.

Figure 2A:
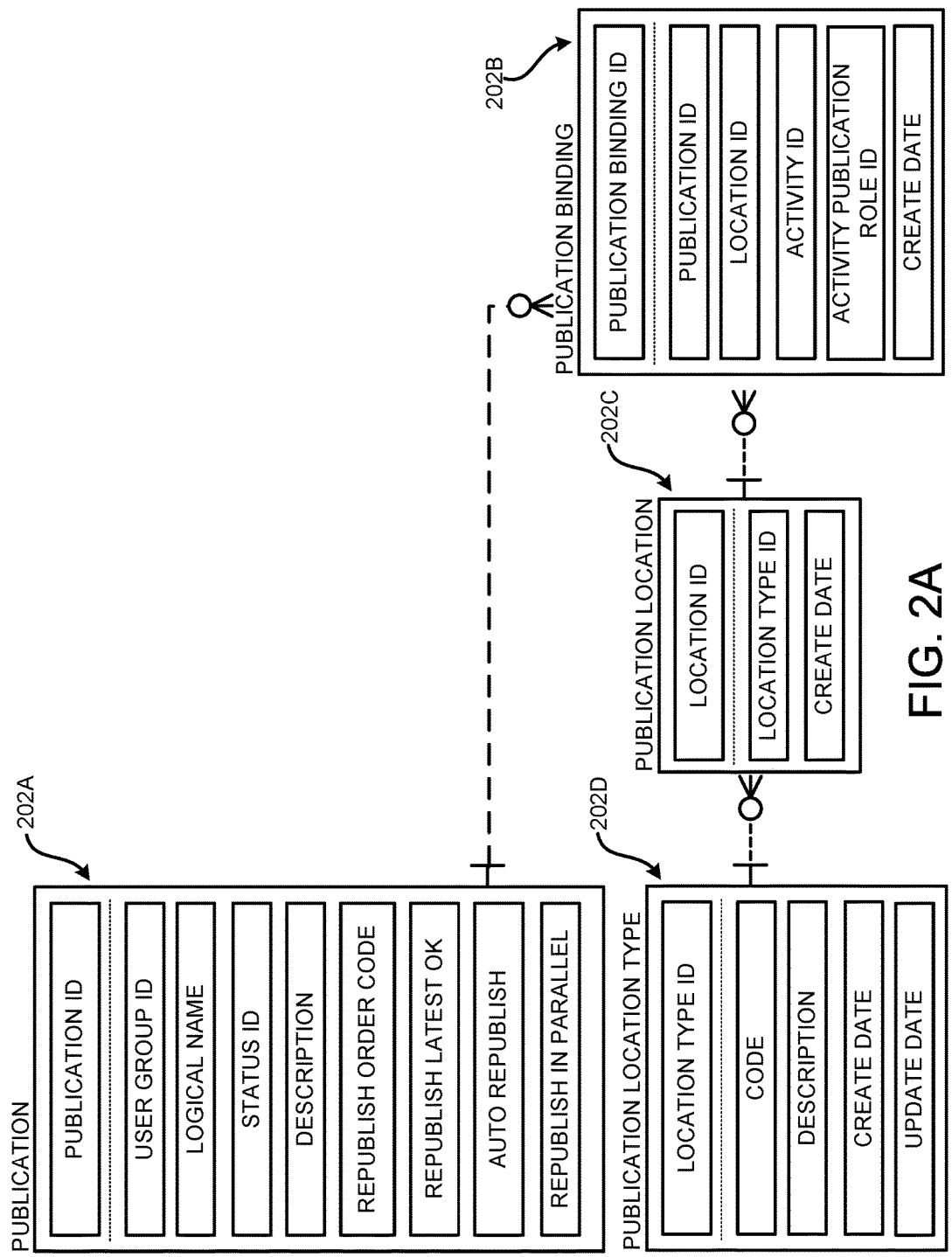
FIGS. 2A and 2B are entity-relationship ("ER") diagrams showing aspects of the contents of a metadata store utilized by an ELT management service in one particular configuration.
Figure 2B:
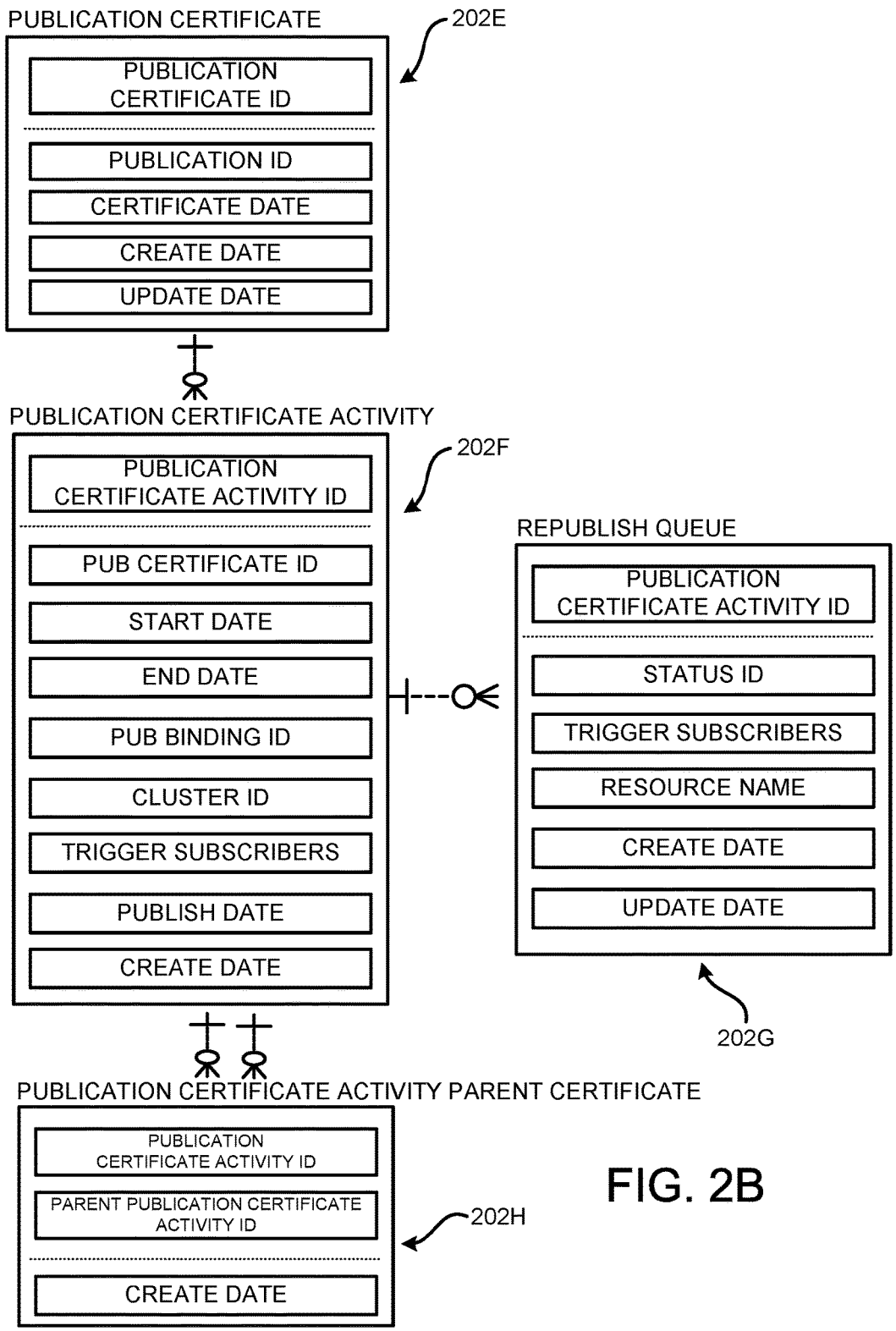

FIGS. 2A and 2B are ER diagrams showing aspects of the contents of a metadata store 118 utilized by the ELT management service 104 in one particular configuration. As illustrated in FIG. 2A, a number of database tables 202A-202D can be maintained in the metadata store 118 that define aspects of the publications 126 described above with regard to FIG. 1. These tables include metadata defining publications 126 and associated publication certificates that can be utilized to provide the subscribe and publish functionality disclosed herein. In this regard, it is to be appreciated that the configuration and content of the database tables shown in FIGS. 2A and 2B are merely illustrative and that other arrangements of data can be utilized in other configurations.

In the configuration illustrated in FIG. 2A, the table 202A has a number of fields storing metadata describing a particular publication. In particular, the "USER GROUP ID" field includes access control data that identifies a group of users having access to a publication. The "LOGICAL NAME" field stores a globally unique ID for the publication 126 so that the same name can be utilized for multiple publications 126. The "STATUS ID" field is set to CREATED when a publication 126 is created. The "STATUS ID" field is set to DELETED when the publication 126 is later deleted. The "DESCRIPTION" field is utilized to store a user-supplied text description of the publication 126. The "REPUBLISH ORDER CODE" field stores data for use in determining whether publications are to be regenerated in chronological or reverse chronological order. The "REPUBLISH LATEST OK" field stored data that allows only the most recent publication to be re-published when needed. The "AUTO REPUBLISH" field stores a flag which, when set, causes the ELT management service 104 to determine the publication certificates for a particular publication 126 that need to be regenerated because one or more of the publication's parent publications have a later publish date than the publication. The "REPUBLISH IN PARALLEL" field provides an option at the publication level that allows publications to be republished in parallel when a load strategy does not require chronological order. When the contents of this field are set to "Y", a parallel republish procedure is utilized. Otherwise, a serial republish procedure is utilized.

The table 202B stores data defining the relationship between publication, location, activity, role (publish or subscribe) uniquely identified by the contents of the "PUBLICATION BINDING ID" field. The "PUBLICATION ID" field identifies the corresponding publication. The "LOCATION ID" field specifies the location of the publication. The "ACTIVITY ID" field identifies the corresponding activity. The "ACTIVITY PUBLICATION ROLE ID" field indicates whether the publication is generated by a publish activity or consumed by a subscribe activity. The "CREATE DATE" field specifies the date and time the publication binding was created.

The table 202C stores data identifying the location of a publication. In particular, the "LOCATION ID" field stores data identifying the location of the publication. The "LOCATION TYPE ID" field identifies the location type for a publication (e.g. a table on a cluster 130 or a file stored by the storage service 128).

The table 202D stores data describing the location type of a publication (e.g. a table on a cluster 130 or a file stored by the storage service 128). In particular, the "LOCATION TYPE ID" field identifies the type of the location of the publication. The "DESCRIPTION" field provides a text description of the location of a publication.

FIG. 2B illustrates the contents of several tables 202E-202G that contain metadata describing a publication certificate. As discussed above, publication certificates describe the creation and change history for the publications 126. In particular, a new publication certificate is created at the time any activity completes. The primary key is a unique sequence ID for a publication certificate that is stored in the "PUBLICATION CERTIFICATE ID" field. This binds the contents of the "PUBLICATION ID" field to a date that is particular to a particular instance of a publication. The "CERTIFICATE DATE" field stores the certificate date, typically the schedule date of a publishing activity or a date relative to the schedule date. As discussed above, however, partitions other than creation date can be utilized in other configurations.

The table 202F contains metadata that describes all activity concerning a publication certificate. The "PUBLICATION CERTIFICATE ACTIVITY ID" field stores the unique sequence ID of the publication certificate activity valid from a start date stored in the "START DATE" field through an end date stored in the "END DATE" field. The "PUBLICATION BINDING ID" field stores the publication binding in effect at the time the publication was created. This relates the publication, the activity that published it, the location of the publication, and the activity publication role. The "CLUSTER ID" field identifies the cluster associated with the publication (i.e. either the cluster 130 from where the publication was extracted or the cluster 130 to which it was loaded). The "TRIGGER SUBSCRIBERS" field tracks whether the ELT management service 104 is to ignore a publication certificate activity record for the purpose of triggering downstream re-publications. For example, and without limitation, this would support the use case of allowing a user to reload a fact table without triggering downstream aggregations. The contents of this field are set by a user when re-running activities.

The table 202G contains keys for identifying the activities that need to be re-run when a publication 126 needs to be re-generated as a result of a change in the data represented by its subscriptions. The table 202H stores data that defines all of a publication certificate's subscribed (i.e. parent) publication certificates that were in effect and satisfied at the time the publication certificate was created.

Figure 3:
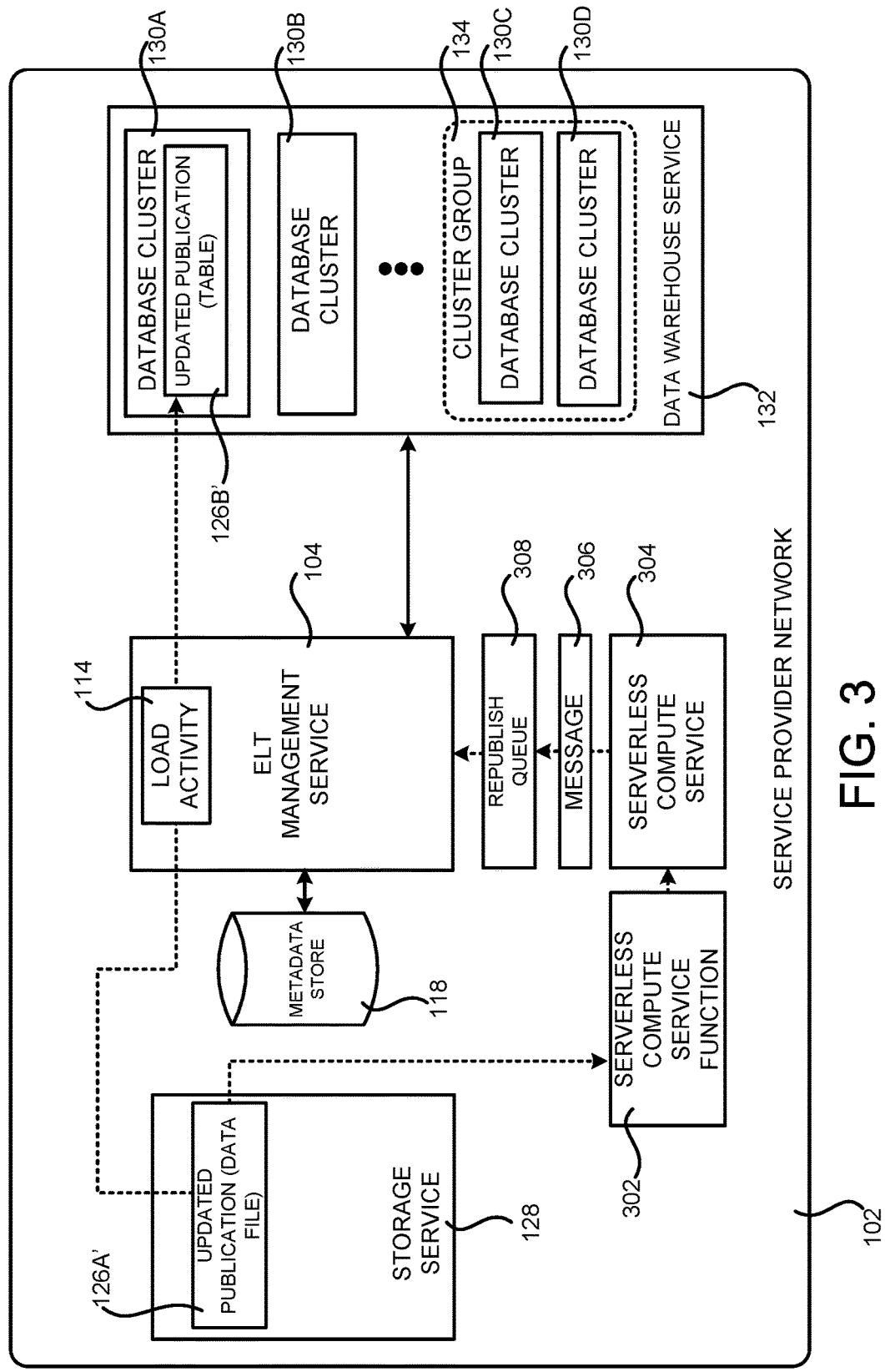
FIG. 3 is a system architecture diagram showing aspects of the operation of an ELT management service 104 for providing automated republishing of publications, according to one particular configuration.

FIG. 3 is a system architecture diagram showing aspects of the operation of the ELT management service 104 for providing automated republishing of publications 126, according to one particular configuration. In this example, the updating of a publication (i.e. the updated publication 126A') will trigger the automatic republication of an updated publication 126B'.

In the particular configuration shown in FIG. 3, a serverless compute function 302 is triggered when the updated publication 126A' is stored. When the serverless compute function 302 is executed by the serverless compute service 304, the serverless compute function 302 places a message 306 on a republish queue 308. The message 306 is automatically is picked up by the ELT management service 104 from an the queue 308, and a new publication certificate for the associated data set(s) is created. The ELT management service 104 then performs a query of the metadata described above to identify the downstream publications 126 that need to need to be republished. If a user selected auto-republish for the publication 126B, the ELT management service 104 triggers the required pipeline and activities (the load activity 114 in the example shown in FIG. 3) to republish it. This can initiate a long chain reaction of re-run events needed to correct publications, thus negating the need for manual re-publication. Additional details regarding this process will be provided below with regard to FIG. 4.

It is to be appreciated that the serverless compute service 304 shown in FIG. 3 is a network service that allows code to be executed (which might be referred to herein as a "serverless compute service function") without provisioning or managing server computers in the service provider network 102. Rather, the serverless compute service 304 can automatically run code in response to the occurrence of events. The code that is executed can be stored by the storage service 128 or in another network accessible location. In this regard, it is to be appreciated that the term "serverless compute service" as used herein is not intended to infer that servers are not utilized to execute the program code, but rather that the serverless compute service 304 enables users to execute code without provisioning or managing server computers. The serverless compute service 304 executes program code only when needed, and only utilizes the resources necessary to execute the code.

Figure 4:
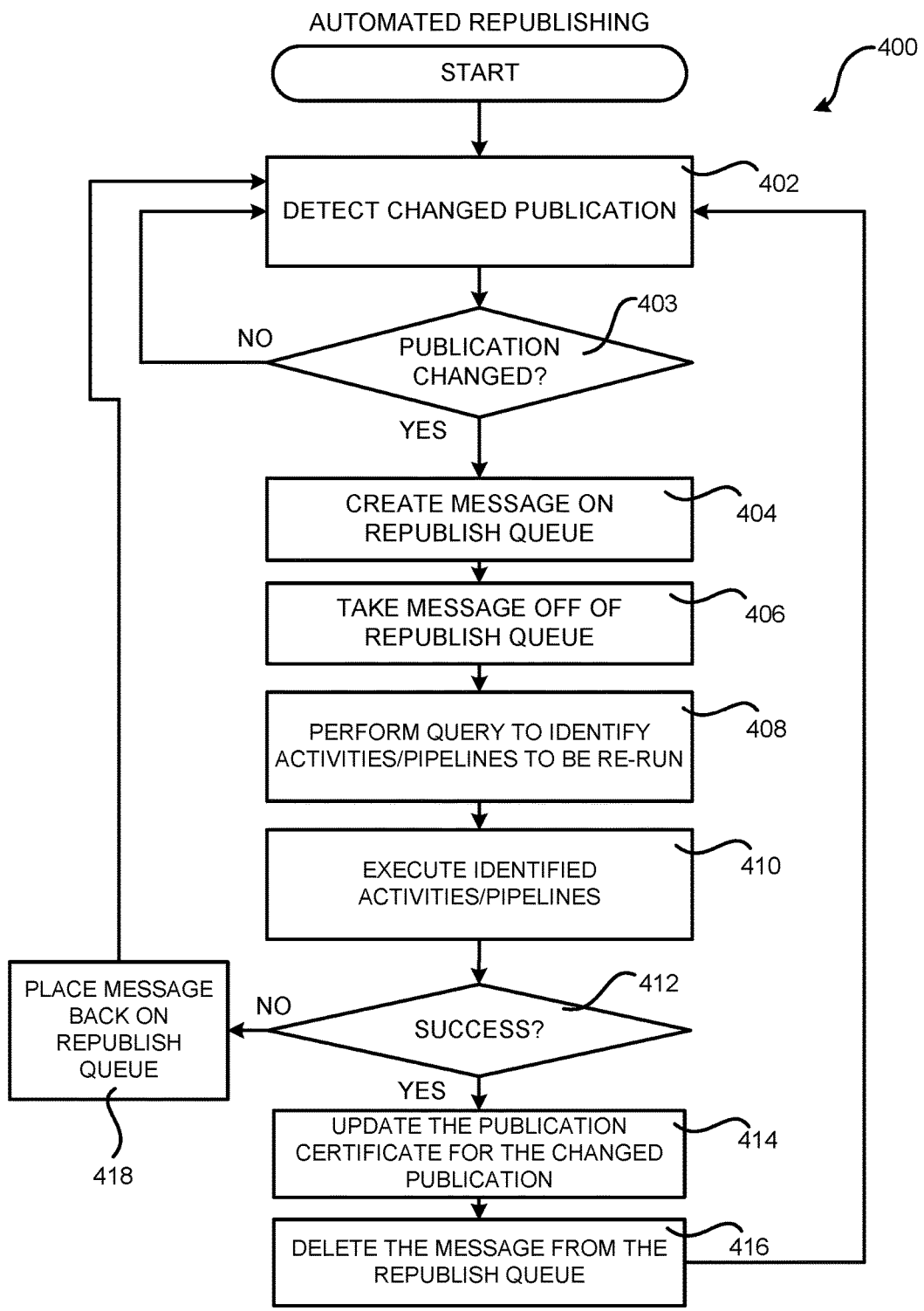
FIG. 4 is a flow diagram illustrating aspects of a routine for automated republishing of publications, according to one particular configuration.

FIG. 4 is a flow diagram illustrating aspects of a routine 400 for automated republishing of publications 106 using the mechanism shown in FIG. 3 and described above, according to one particular configuration. It should be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The routine 400 begins at operation 402, where a determination is made as to whether a publication 126 has been changed. If a publication 126 has been changed, the routine 400 proceeds from operation 403 to operation 404, where the serverless compute service function 302 is executed. As discussed above, the serverless compute service function 302 is configured to place a message 306 on the republish queue 308 indicating that the publication 126 has been changed.

From operation 404, the routine 400 proceeds to operation 406, where the ELT management service 104 takes the message 306 off of the queue 308. The routine 400 then proceeds to operation 408, where the ELT management service 104 performs a query of the metadata stored in the metadata store 118 to identify the pipelines and activities that are to be re-run to republish the publication 126. Once the pipelines and activities have been identified, the routine 400 proceeds to operation 410, where the identified pipelines and activities are executed in order to re-publish the publication 126.

From operation 410, the routine 400 proceeds to operation 412, where the ELT management service 104 determines if the execution of the pipelines and activities was successful. If execution was not successful, the message 308 is placed back on the republish queue 208 at operation 418. The routine 400 then proceeds back to operation 402, where other publications can be automatically republished in the manner described above. In some configurations, the execution of the pipelines and activities can be retried a number of times. If the execution fails a specified number of times, the message 308 can be removed from the republish queue 208 and an alert can be generated that notifies an administrator of the execution failure.

If, at operation 412, the ELT management service 104 determines that the execution as successful, the routine 400 proceeds to operation 414. At operation 414, the ELT management service 104 updates the publication certificate for the changed publication. The routine 400 then proceeds to operation 416, where the message 306 is deleted from the republish queue 308. From operation 416, the routine 400 then proceeds back to operation 402, where other publications can be automatically republished in the manner described above.

Figure 5:
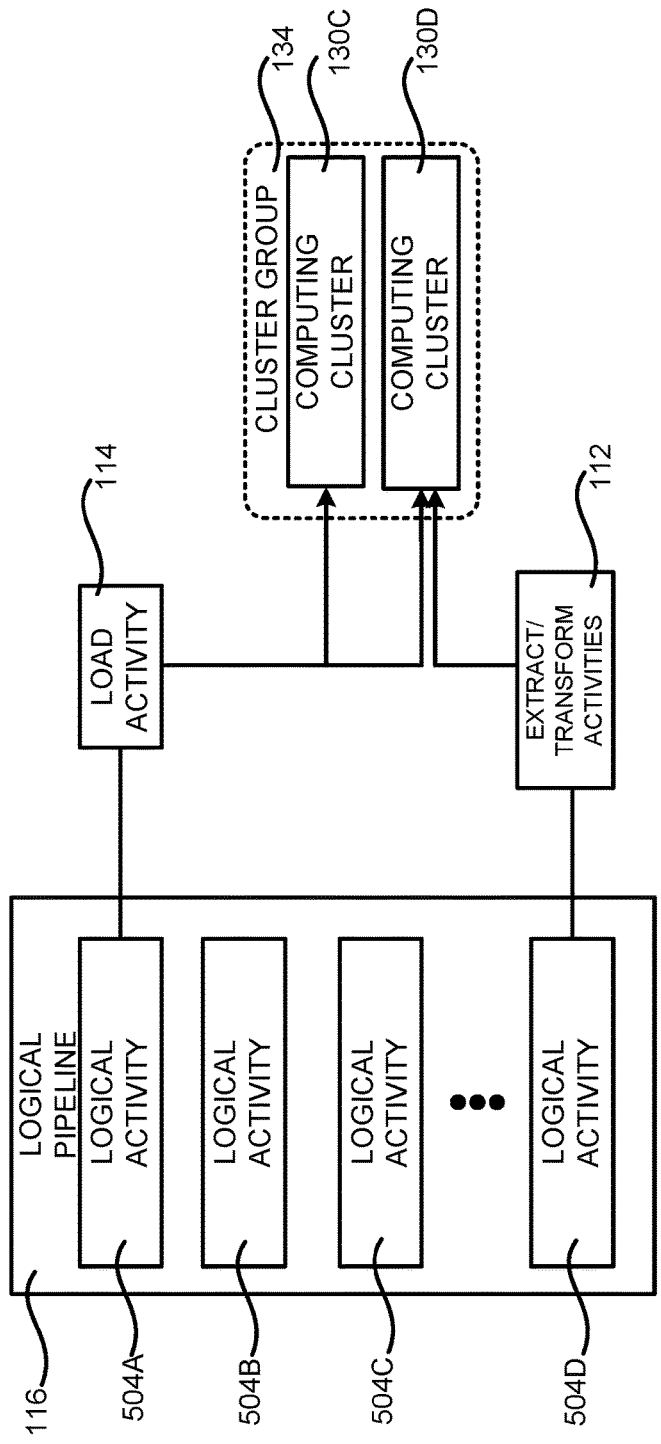
FIG. 5 is a system architecture diagram showing aspects of the operation of an ELT management service for providing logical pipeline and multi-cluster support, according to one configuration disclosed herein.

FIG. 5 is a system architecture diagram showing aspects of the operation of the ELT management service 104 for providing logical pipeline and multi-cluster support, according to one configuration disclosed herein. As discussed above with regard to FIG. 1, the UI 106 provided by the ELT management service 104 can also provide functionality for defining a logical pipeline 116, which can include one or more logical activities 504A-504D. As also discussed above, a logical activity 504 is an activity that is configured to run against a cluster group 134, which may contain one or more clusters 130. In the example shown in FIG. 5, for instance, the cluster group 134 includes two database clusters 130C and 130D. Other cluster groups 134 can include more database clusters 134.

Logical load activities, such as the load activity 114, automatically run against every cluster 130 in a cluster group 134. Logical extract/transform activities, such as the extract/transform activities 112, run against only one cluster 130 in a cluster group 134, where a number of preconditions and, potentially, user-specified rules, are met. The multi-cluster support enabled by the technologies disclosed herein allows activities to run on different clusters, which can improve performance and operational flexibility. Examples include, but are not limited to, running activities on an alternative cluster 130 because the usual cluster 130 it runs on is down, running an activity on the cluster 130 that has the data it needs first, running an activity on a particular cluster 130 for performance reasons, and running an activity on a particular cluster 130 in order to support load balancing. Additional details regarding the operation of the ELT management service 104 for providing virtual pipeline and multi-cluster support, will be provided below with regard to FIG. 6.

Figure 6:
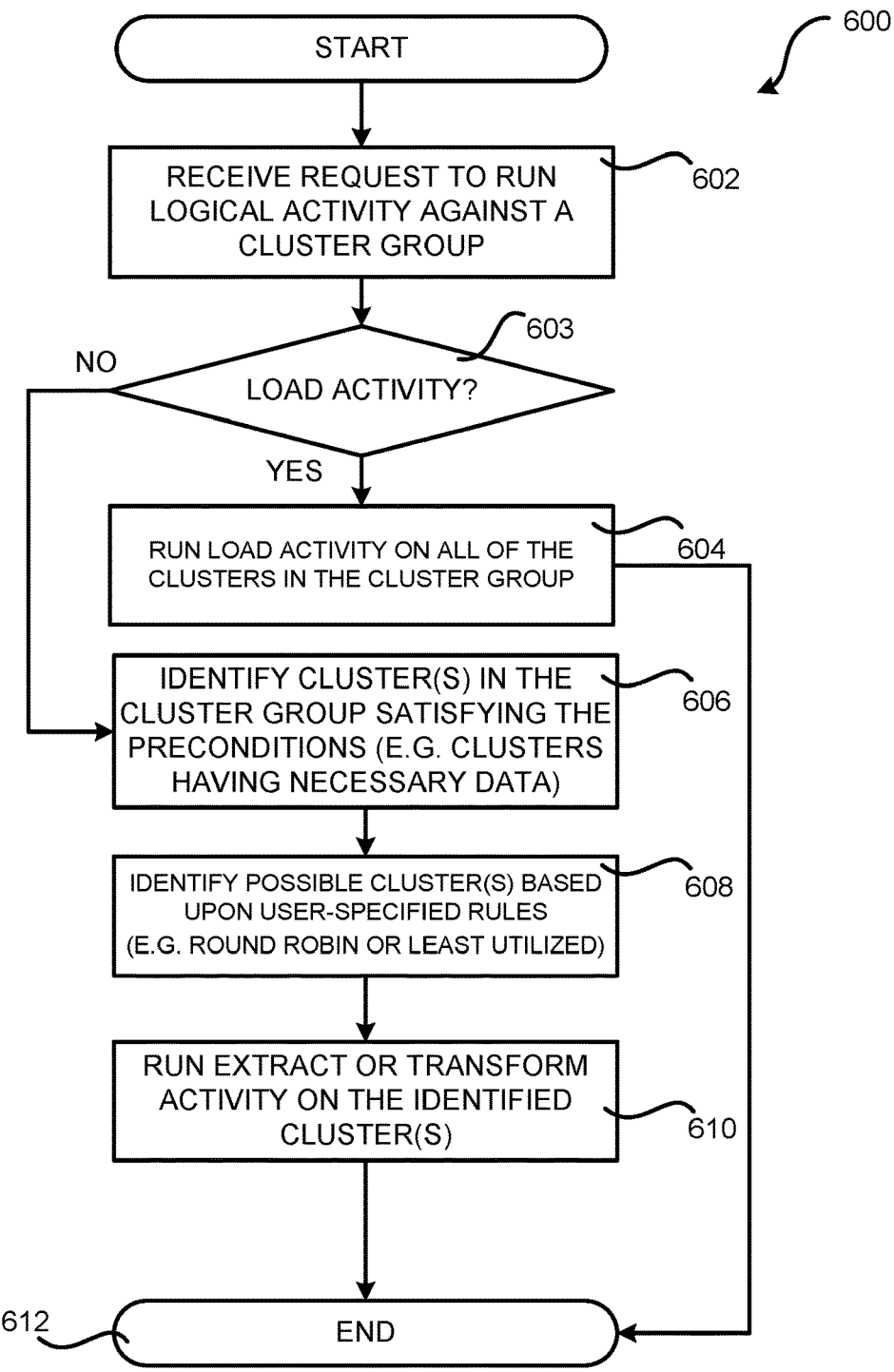
FIG. 6 is a flow diagram illustrating aspects of a routine for providing logical pipeline and multi-cluster support, according to one configuration disclosed herein.

FIG. 6 is a flow diagram illustrating aspects of a routine 600 for providing logical pipeline and multi-cluster support, according to one configuration disclosed herein. The routine 600 begins at operation 602, where a request is received to run a logical activity 504 against the clusters 130 in a cluster group 134. If the logical activity 504 to be executed is a load activity 114, the routine 600 proceeds from operation 603 to operation 604, where the load activity 114 is executed on all of the clusters 130 in the cluster group 134. The routine 600 then proceeds from operation 604 to operation 612, where it ends.

If, at operation 603, it is determined that the logical activity 504 to be executed is an extract/transform activity 112, the routine 600 proceeds from operation 603 to operation 606. At operation 606, the ELT management service 104 identifies the clusters 130 in the cluster group 134 that satisfy any required preconditions. One precondition is a requirement that a cluster 130 have the data upon which the extract/transform activity 112 is to be performed. Other types of preconditions can be specified in other configurations.

Once the clusters 130 satisfying the preconditions have been identified, the routine 600 proceeds from operation 606 to operation 608. At operation 608, the ELT management service 104 identifies a cluster 130 in the cluster group 134 from among the clusters 130 satisfying the preconditions based upon user-specified rules. The user-specified rules might, for example, specify the order in which activities are to be executed, a rule indicating that activities are to be load balanced, a rule indicating that clusters 130 are to be chosen in a round-robin or other fashion, or a rule specifying that the activity is to be run on the cluster 130 that is ready to run the activity first. Other types of user-specified rules can be utilized in other configurations.

Once a cluster 130 has been selected, the routine 600 proceeds to operation 610, where the extract/transform activity 112 is executed on the selected cluster 130. The routine 600 then proceeds from operation 610 to operation 612, where it ends.

Figure 7:
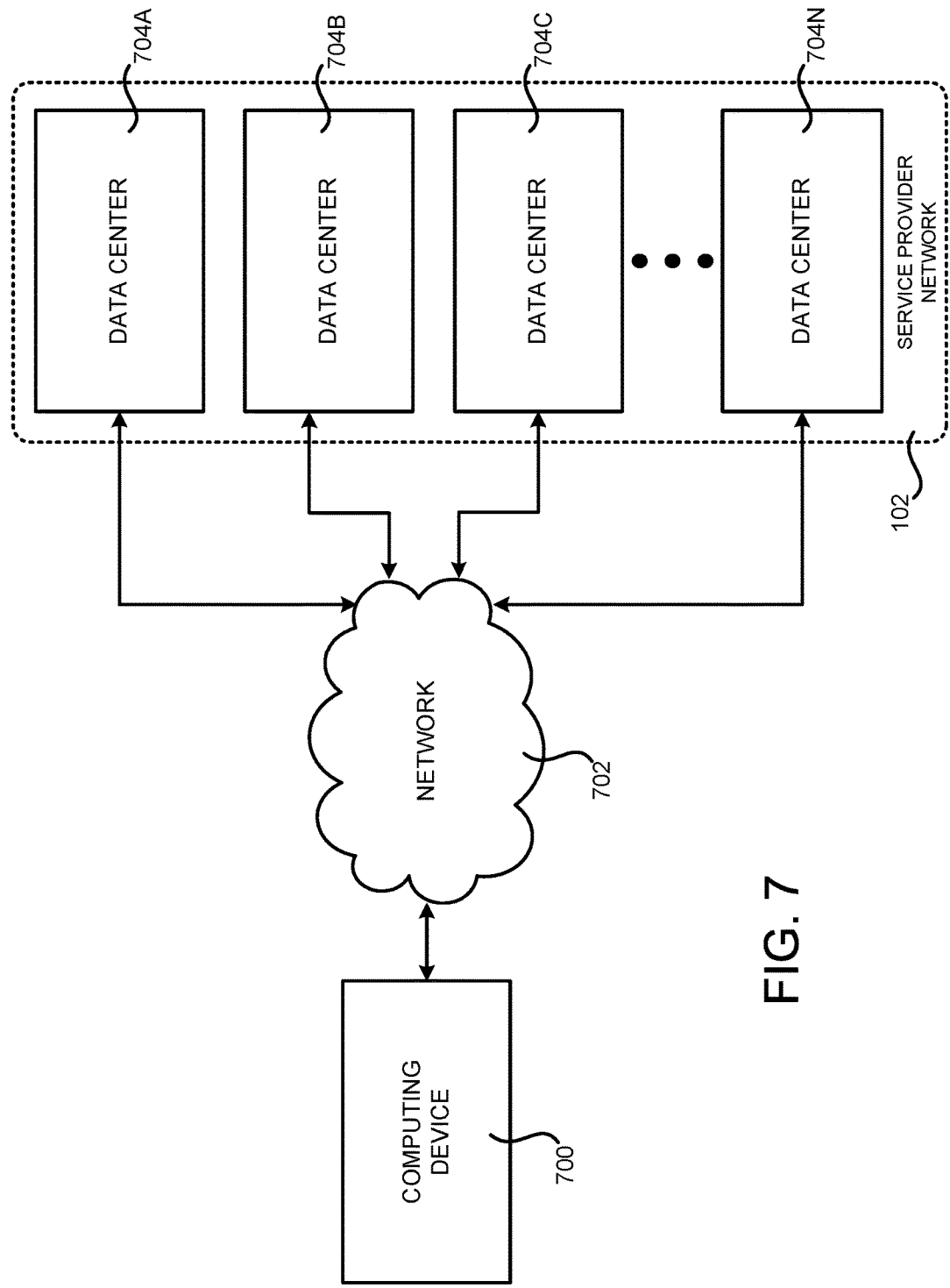
FIG. 7 is a system and network diagram that shows an illustrative operating environment that includes a service provider network that can be configured to implement aspects of the functionality described herein.

FIG. 7 is a system and network diagram that shows one illustrative operating environment for the configurations disclosed herein that includes a service provider network 102 that can be configured to provide the ELT management service 104 disclosed herein. As discussed above, the service provider network 102 can provide computing resources, like VM instances and storage, on a permanent or an as-needed basis. Among other types of functionality, the computing resources provided by the service provider network 102 can be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 8.

The customers and other users of the service provider network 102 can access the computing resources provided by the service provider network 102 over a network 702, which can be a wide area communication network ("WAN"), such as the Internet, an intranet or an Internet service provider ("ISP") network or a combination of such networks. For example, and without limitation, a computing device 700 operated by a customer or other user of the service provider network 102 can be utilized to access the service provider network 102 by way of the network 702. It should be appreciated that a local-area network ("LAN"), the Internet, or any other networking topology known in the art that connects the data centers 704 to remote customers and other users can be utilized. It should also be appreciated that combinations of such networks can also be utilized.

Figure 8:
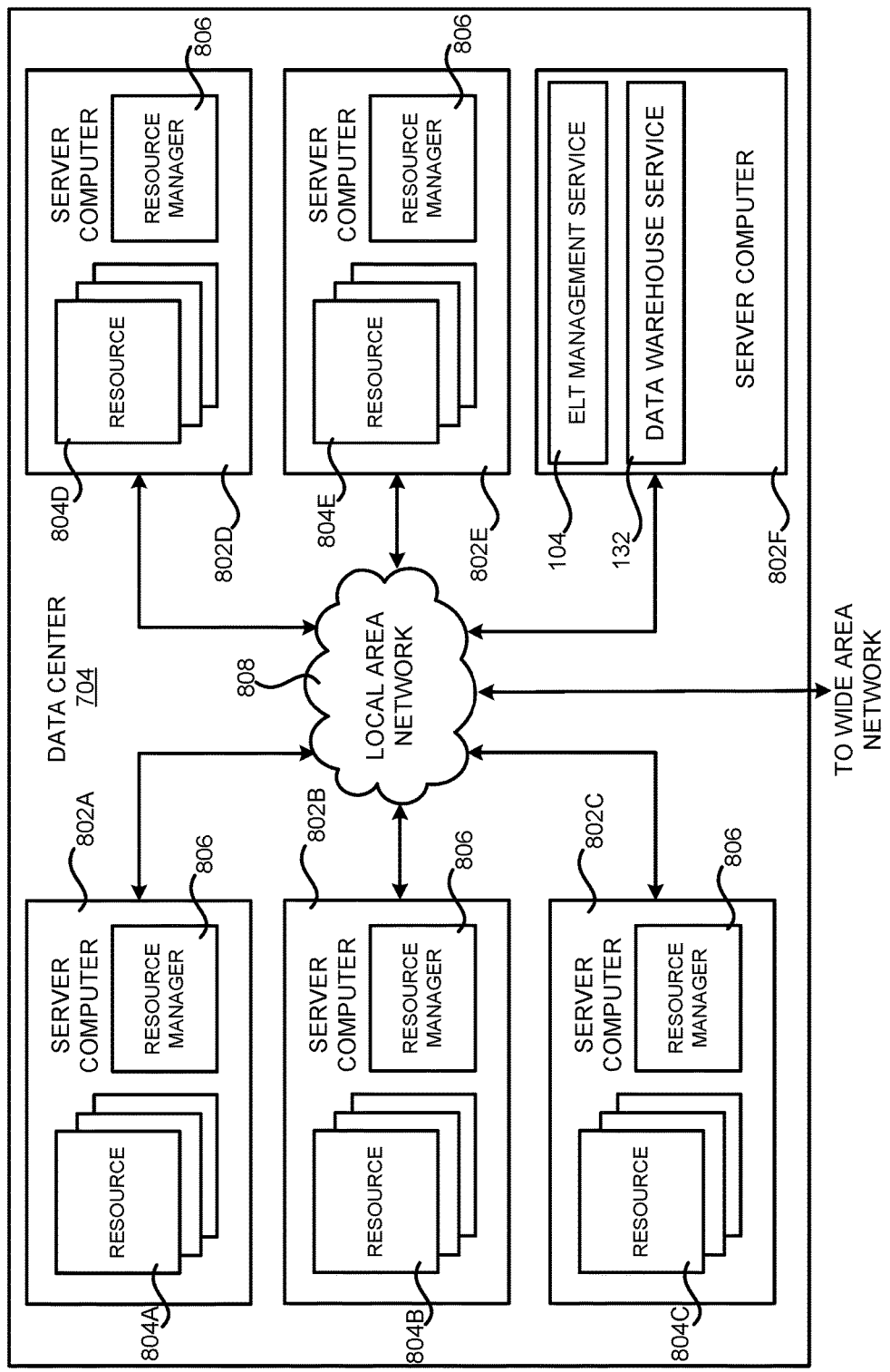
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein for providing a managed computing service 104. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rackmount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 9.

The data center 704 shown in FIG. 8 also includes a server computer 802F that can execute some or all of the software components described above. For example, and without limitation, the server computer 802F can be configured to execute the ELT management service 104, the data warehouse service 132, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the data centers 704. It should be appreciated that the configuration of the data center 704 described with reference to FIG. 8 is merely illustrative and that other implementations can be utilized.

Figure 9:
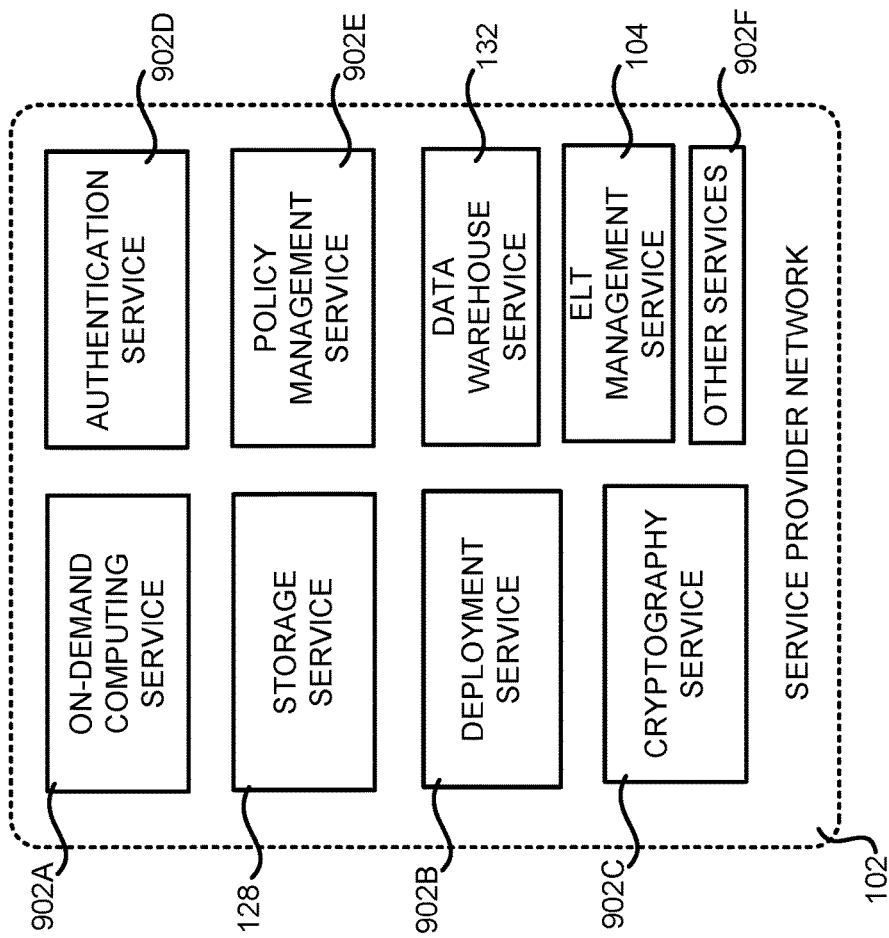
FIG. 9 is a system and network diagram that shows aspects of several services that can be provided by and utilized within a service provider network in one configuration disclosed herein.

FIG. 9 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the ELT management service 104. The service provider network 102 can also provide other types of services including, but not limited to, an on-demand computing service 902A, the storage service 128, a deployment service 902B, a cryptography service 902C, an authentication service 902D, and/or a policy management service 902E, some of which are described in greater detail below. Additionally, the service provider network 102 can also provide other services 902F, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 702 shown in FIG. 7. Communications from a customer computing device, such as the computing device 700 shown in FIG. 7, to the service provider network 102 can cause the services provided by the service provider network 102 to operate in accordance with the described configurations or variations thereof.

It is noted that not all configurations described include the services described with reference to FIG. 9 and that additional services can be provided in addition to or as an alternative to services explicitly described. Each of the services shown in FIG. 9 can also expose web service interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from the data storage service 112). Additional details regarding some of the services shown in FIG. 9 will now be provided.

As discussed above, the on-demand computing service 902A can be a collection of computing resources configured to instantiate VM instances and to provide other types of computing resources on demand. For example, a customer or other user of the service provider network 102 can interact with the on-demand computing service 902A (via appropriately configured and authenticated API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 102, such as a computer system or computer system service that does not employ virtualization and instead provisions computing resources on dedicated or shared computers/servers and/or other physical devices.

The storage service 128 can include software and computing resources that collectively operate to store data using block or file-level storage devices (and/or virtualizations thereof). The storage devices of the storage service 128 can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 902C. The cryptography service 902C can utilize storage services of the service provider network 102, such as the storage service 902A, to store encryption keys in encrypted form, whereby the keys are usable to decrypt customer keys accessible only to particular devices of the cryptography service 902C. The cryptography service 902C can also provide other types of functionality not specifically mentioned herein. The cryptography service 902C can be utilized by the ELT management service 104 to access encrypted data 110 stored in the storage service 112.

As illustrated in FIG. 9, the service provider network 102, in various configurations, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 902F based, at least in part, on the needs of its customers. For instance, the service provider network 102 can maintain a deployment service 902B for deploying program code and/or a data warehouse service 132 in some configurations. Other services include object-level archival data storage services, database services, and services that manage, monitor, interact with, or support other services. The service provider network 102 can also be configured with other services not specifically mentioned herein in other configurations.

Figure 10:
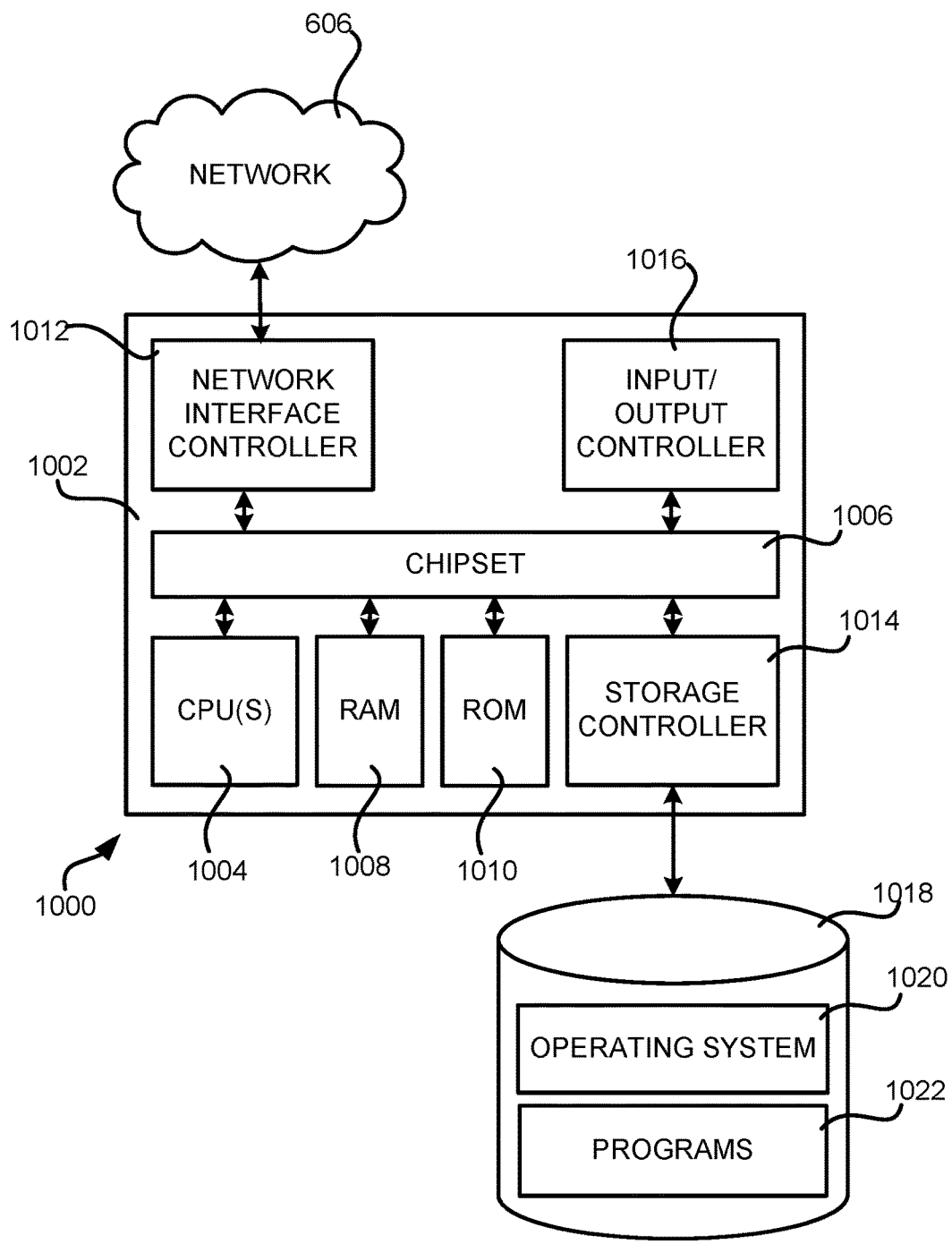
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 606. The chipset 1006 can include functionality for providing network connectivity through a NIC 1012, such as a gigabit Ethernet adapter. The NIC 1012 is capable of connecting the computer 1000 to other computing devices over the network 606. It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022, and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one configuration, the operating system comprises the LINUX operating system. According to another configuration, the operating system comprises the WINDOWS® SERVER operating system from MICROSOFT Corporation of Redmond, Wash.

According to further configurations, the operating system can comprise the UNIX operating system or one of its variants. It should be appreciated that other operating systems can also be utilized. The mass storage device 1018 can store other system or application programs and data utilized by the computer 1000.

In one configuration, the mass storage device 1018 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, a plotter, or other type of output device. It will be appreciated that the computer 1000 might not include all of the components shown in FIG. 10, can include other components that are not explicitly shown in FIG. 10, or might utilize an architecture completely different than that shown in FIG. 10.

Based on the foregoing, it should be appreciated that technologies for implementing publish and subscribe functionality in an ELT management service 104 have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
   one or more processors; and
   at least one non-transitory computer-readable storage medium having instructions stored thereupon which are executable by the one or more processors and which, when executed, cause the one or more processors to perform acts comprising: storing metadata that describes a plurality of publications and publication certificates associated with the plurality of publications, the publication certificates comprising data describing creation and change history of the plurality of publications, the plurality of publications comprising database tables on database clusters provided by a data warehouse service executing in a service provider network and files stored by a storage service executing in the service provider network, the database clusters comprising interconnected databases that are connected via a network in a distributed computing environment;

performing a query against the metadata to generate a list of publications, wherein the list of publications derives publications from one or more other publications that have changed since the publications in the list of publications were last generated; and triggering execution of one or more pipelines to republish the publications identified in the list of publications by executing one or more extract, transform, or load activities, wherein the one or more pipelines comprise one or more logical activities that execute against a cluster group included in one or more of the database clusters, the one or more logical activities comprising at least one of the one or more extract, transform, or load activities.

2. The system of claim 1, wherein the metadata describing the plurality of publications further comprises a publication identifier, a publication location, and a publication name.

3. The system of claim 2, wherein the metadata further comprises a publication description, validation logic, and access control data for groups of users to access a publication.

4. The system of claim 1, wherein the cluster group further comprises a plurality of database clusters that are connected via the network and that are provided by the data warehouse service executing in the service provider network.

5. The system of claim 4, wherein at least one of the one or more logical activities comprises a database extract activity or a database transform activity that executes against only one of the plurality of database clusters in the cluster group.

6. The system of claim 4, wherein at least one of the one or more logical activities comprises a database load activity that executes against each of the plurality of database clusters in the cluster group.

7. A non-transitory computer-readable storage medium having computer-executable instructions stored thereupon which, when executed by a computer, cause the computer to:

store metadata describing a plurality of publications and publication certificates associated with the plurality of publications, the publication certificates comprising data describing creation and change history of the plurality of publications, the plurality of publications comprising a database table stored on a database cluster, the database cluster comprising interconnected databases that are connected via a network in a distributed computing environment;

perform a query against the metadata to generate a list of the plurality of publications, wherein the plurality of publications in the list is derived from one or more other publications that have changed since the plurality of publications in the list were last generated; and cause one or more pipelines to be executed against a cluster group to republish the plurality of publications identified in the list, wherein the cluster group is included in the database cluster, and wherein the one or more pipelines comprise one or more logical activities that execute against the cluster group, the one or more logical activities comprising one or more extract, transform, or load activities.

8. The non-transitory computer-readable storage medium of claim 7, wherein the database cluster is provided by a data warehouse service executing in a service provider network.

9. The non-transitory computer-readable storage medium of claim 7, wherein the plurality of publications comprise a file stored by a storage service executing in a service provider network.

10. The non-transitory computer-readable storage medium of claim 7, wherein the cluster group further comprising a plurality of database clusters that are connected via the network and that are provided by a data warehouse service executing in a service provider network.

11. The non-transitory computer-readable storage medium of claim 10, wherein at least one of the one or more logical activities comprises a database load activity that executes against each of the plurality of database clusters in the cluster group.

12. The non-transitory computer-readable storage medium of claim 10, wherein at least one of the logical activities comprises a database extract activity or a database transform activity that executes against only one of the plurality of database clusters in the cluster group.

13. The non-transitory computer-readable storage medium of claim 12, wherein the one of the plurality of database clusters is selected based, at least in part, upon one satisfaction of one or more preconditions.

14. The non-transitory computer-readable storage medium of claim 12, wherein the one of the plurality of database clusters is selected based, at least in part, upon one or more user-specified rules.

15. A computer-implemented method, comprising:

storing metadata describing a plurality of publications and publication certificates associated with the plurality of publications, the publication certificates comprising data describing creation and change history of the plurality of publications, the plurality of publications comprising a database table stored on a database cluster, the database cluster comprising interconnected databases that are connected via a network in a distributed computing environment;

causing a query to be performed against the metadata to generate a list of the plurality of publications, wherein the plurality of publications in the list is derived from one or more other publications that have changed since the plurality of publications in the list were last generated; and causing one or more pipelines to be executed against a cluster group to republish the plurality of publications identified in the list, wherein the cluster group is included in the database cluster, and wherein the one or more pipelines comprise one or more logical activities that execute against the cluster group, the one or more logical activities comprising one or more extract, transform, or load activities.

16. The computer-implemented method of claim 15, wherein the cluster group further comprising a plurality of database clusters that are connected and that are provided by a data warehouse service executing in a service provider network.

17. The computer-implemented method of claim 16, wherein at least one of the one or more logical activities comprises a database load activity that executes against each of the plurality of database clusters in the cluster group.

18. The computer-implemented method of claim 16, wherein at least one of the one or more logical activities comprises a database extract activity or a database transform activity that executes against only one of the plurality of database clusters in the cluster group.

19. The computer-implemented method of claim 18, wherein the one of the plurality of database clusters is selected based, at least in part, upon one satisfaction of one or more preconditions.

20. The computer-implemented method of claim 18, wherein the one of the plurality of database clusters is selected based, at least in part, upon one or more user-specified rules.

* * * * *